United States Patent
Uchiyama et al.

[11] Patent Number: 5,926,253
[45] Date of Patent: Jul. 20, 1999

[54] APPARATUS FOR EXPOSING INDEX PRINTS, INDEX PRINTER, AND PHOTOGRAPHIC PRINTER

[75] Inventors: Kaoru Uchiyama; Toshio Itoh; Eiichi Kito; Toshiyuki Hiroishi, all of Kanagawa, Japan

[73] Assignee: Fuji Photo Film Co., Ltd., Kanagawa, Japan

[21] Appl. No.: 08/590,754

[22] Filed: Jan. 24, 1996

[30] Foreign Application Priority Data

Jan. 27, 1995 [JP] Japan .................................. 7-011786
Jan. 18, 1996 [JP] Japan .................................. 8-006860

[51] Int. Cl.$^6$ .................................................. G03B 27/52
[52] U.S. Cl. ............................................. 355/40; 355/39
[58] Field of Search .................................. 355/39, 40, 41, 355/42, 43, 44; 358/78, 302, 350; 395/105

[56] References Cited

U.S. PATENT DOCUMENTS

| | | | |
|---|---|---|---|
| 4,712,909 | 12/1987 | Oshikoshi | 355/20 |
| 4,849,809 | 7/1989 | Tahara et al. | 358/75 |
| 4,903,068 | 2/1990 | Shiota | 355/40 X |
| 4,933,773 | 6/1990 | Shiota et al. | 358/302 |
| 5,563,984 | 10/1996 | Tanibata | 395/105 |

FOREIGN PATENT DOCUMENTS 618501  10/1994  European Pat. Off. .
1-274125 11/1989 Japan .
1-274126 11/1989 Japan .

*Primary Examiner*—Fred L. Braun
*Attorney, Agent, or Firm*—Sughrue, Mion, Zinn, Macpeak & Seas, PLLC

[57] ABSTRACT

An apparatus for exposing index prints, in which a plurality of images recorded on a photographic film are displayed on an image display device and a photographic printing paper is exposed by light transmitted through the image display device so that an index print is prepared on the photographic printing paper such that the plurality of images are arranged in a matrix. The apparatus includes a system for setting the number of frames displayed on the image display device and exposure magnification of the images displayed on the image display device; dividing a plurality of image frames of the photographic film every predetermined number of frames to be displayed on the image display device; displaying, on the image display device, the plurality of image frames of the photographic film every predetermined number of the divided image frames; and exposing the divided plurality of image frames on the photographic printing paper at predetermined intervals in accordance with display of the image display device. Further, a photographic printer includes a film exposure section, an index exposure section, a conveying device, and a light-source controlling device for controlling an amount of light from the light source based on an operating condition of the index exposure section.

10 Claims, 8 Drawing Sheets

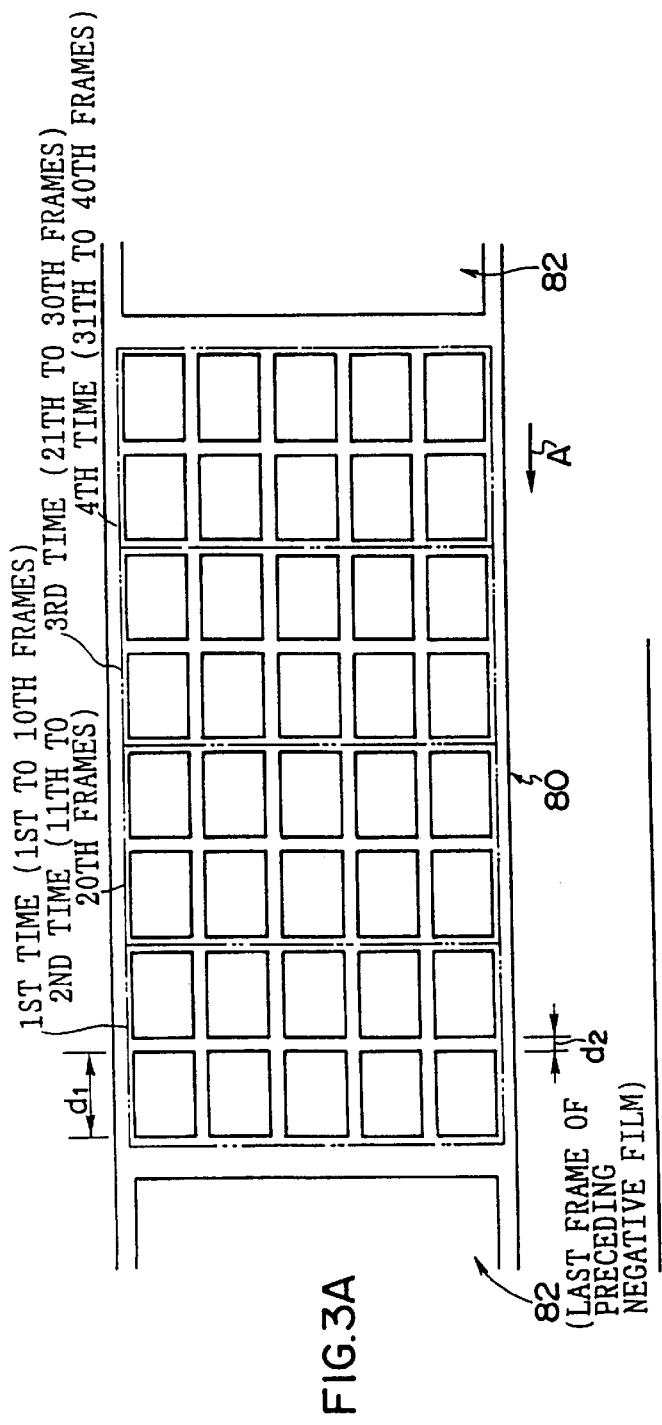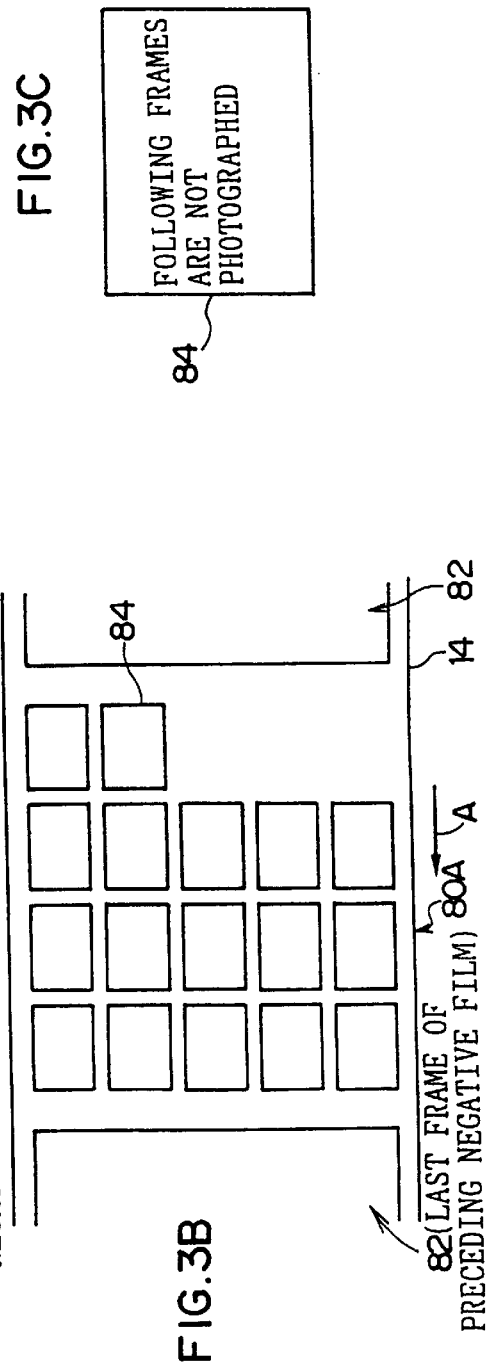

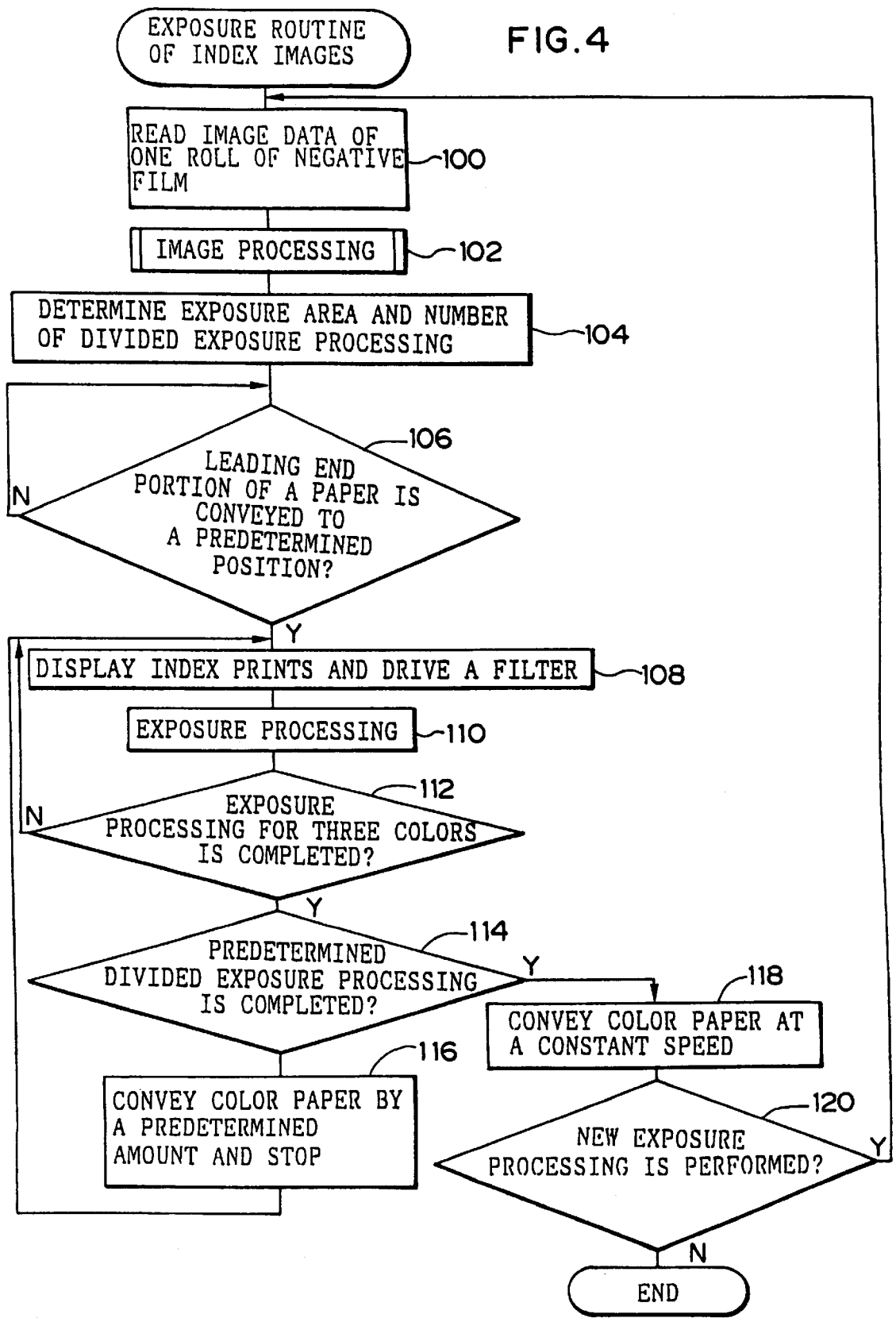

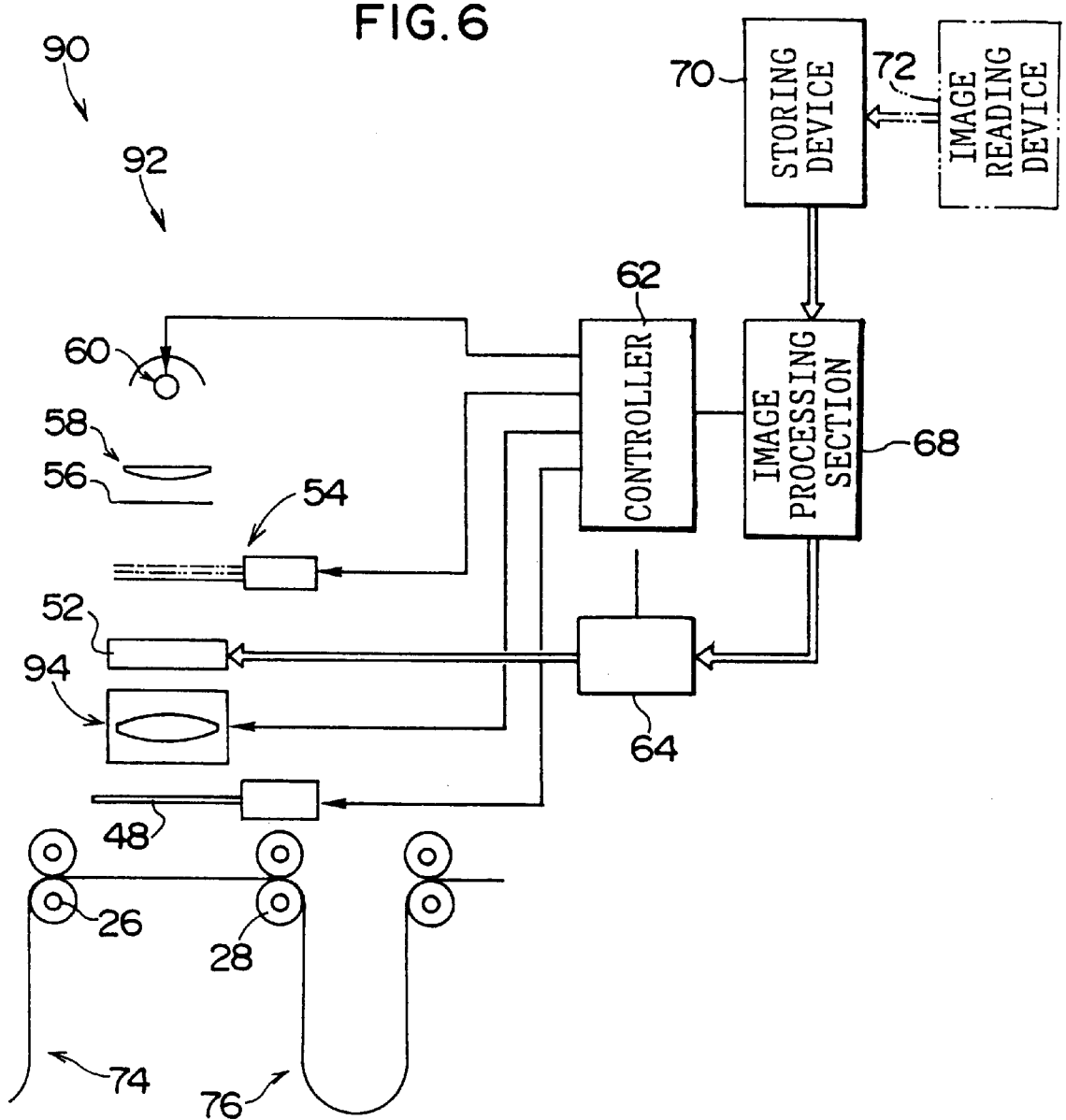

APPARATUS FOR EXPOSING INDEX PRINTS, INDEX PRINTER, AND PHOTOGRAPHIC PRINTER

BACKGROUND OF THE INVENTION

1. Field of the Invention

The present invention relates to a method of exposing an index print in which images recorded on a photographic film are disposed in a matrix, an index printer, and a photographic printer having a function of preparing index prints.

2. Description of the Related Art

Index prints may be used to quickly recognize images recorded on a photographic film (for example, a negative film, and which is hereinafter referred to as a negative film) on which images have been photographed by a photographing apparatus such as a camera and which have been subjected to development processing.

For example, it has been proposed to accommodate and store a negative film in a cartridge after being subjected to development processing. Index prints are very useful for identifying what images are recorded on a negative film stored in such a cartridge.

Index prints are constructed such that images of all frames recorded on one roll of negative film are recorded on a photographic printing paper in a matrix. To effect recording in a matrix of the index prints of all of the frames recorded on one roll of negative film, all of the images are displayed on a CRT and the photographic printing paper is exposed in accordance with the index images displayed on the CRT.

It has been proposed that various image display devices be used to expose such index images. However, when index prints are prepared in a state in which images of all frames recorded on one roll of negative film are displayed at the same time, the index print apparatus is excessively large and it is often difficult to incorporate the function of preparing index prints into a conventional photographic printer for preparing photographic prints. For this reason, small-sized display panels, such as a liquid crystal display panel (which is hereinafter referred to as an "LCD panel"), a plasma display, or a PLZT (transparent ceramics display) have been studied for use as the image display device. These display panels can be made extremely small even if a light source is provided separately, so as to be easily incorporated into the photographic printer.

However, the small-sized display panel is limited in size, and when images of all frames on one roll of negative film are displayed on the display panel, an image of each frame is made smaller as the number of frames on the roll increases. Accordingly, when the photographic printing paper is exposed in accordance with index images displayed on the image display device, the index print may be finished with coarse-grained images. Further, there exist various drawbacks such that some of small-sized image display device deteriorate due to heat from a light source or self-generating heat so that gradation of a displayed image varies, and it may become difficult to expose the photographic printing paper in uniform quality for a long period of time.

Further, there are several types of negative films, which have different numbers of frames for photographing, and one roll of negative film may be subjected to development processing with frames not subjected to photographing remaining thereon. Such frames not subjected to photographing are indicated as empty frames on the index print and an outward appearance (the look) of the index print worsens. Further, when an empty frame is excluded to save the amount of photographic printing paper, it becomes unclear whether an image has actually been recorded on the frame.

SUMMARY OF THE INVENTION

It is an object of the present invention to provide a method of exposing index prints for preparing suitable index prints when an index print based on index images displayed on an image display device is prepared on a photographic printing paper together with and subsequent to photographic prints of images recorded on a photographic film, and to provide an index printer and a photographic printer for preparing the index prints by using the image display device.

In a first aspect of the present invention a plurality of images recorded on a photographic film are displayed on an image display device and the plurality of images displayed on the image display device are exposed onto a photographic printing paper so that an index print constructed such that the plurality of images arranged in a matrix is recorded on the photographic printing paper. This method of exposing index prints includes the steps of: setting the number of frames displayed on the image display device and setting the exposure magnification of the images to be exposed on the photographic printing paper; dividing a plurality of image frames of the photographic film into sets of image frames having a predetermined number of frames; displaying sequentially, on the image display device, the plurality of image frames of the photographic film in sets of image frames; and exposing the divided plurality of image frames on the photographic printing paper at predetermined intervals in accordance with the display of the image display device.

In a second aspect of the present invention, there is provided a method of exposing index prints for preparing, on a photographic printing paper, index prints in which a plurality of images are arranged in a matrix. The method includes the steps of: displaying a plurality of images recorded on a photographic film onto an image display device; and exposing the photographic printing paper by light transmitted through the image display device, wherein the exposure operation of the photographic printing paper is effected in such a manner that, when there is a frame on which no image is recorded, a predetermined indicating frame which indicates that no image is recorded is disposed at a position, on the image display device, of the frame on which no image is recorded.

In a third aspect of the present invention, there is provided a method of exposing index prints for preparing, on a photographic printing paper, index prints in which a plurality of images are arranged in a matrix. According to the third aspect of the present invention, in the method of the second aspect of the present invention, the exposure operation of the photographic printing paper is effected in such a manner that, when frames on which no image is recorded are continuously disposed on the photographic film, a display of the image display device is provided such that the indicating frame is disposed at a position of a first unexposed frame and a frame on which a subsequent image is recorded is disposed at a position of other unexposed frames immediately after the first unexposed frame.

In a fourth aspect of the present invention, there is provided a method of exposing index prints for preparing, on a photographic printing paper, index prints in which a plurality of images are arranged in a matrix. The method includes the steps of: displaying a plurality of images recorded on a photographic film on an image display device; and exposing the photographic printing paper by light transmitted through the image display device, using exposure magnification, wherein an image size of each frame displayed on the image display device and a dimension of a space between adjacent images are respectively changed in accordance with the exposure magnification and the images are exposed onto the photographic printing paper.

According to a fifth aspect of the present invention, there is provided a photographic printer comprising: a film exposure section in which an elongated photographic printing paper is exposed at a predetermined interval in accordance with images recorded on frames of a photographic film; an index exposure section having an image display device and a light source, wherein the images recorded on frames of the photographic film are displayed on the image display device in a matrix form and the images displayed on the image display device are exposed as index images at a predetermined position of the photographic printing paper; a conveying device for conveying the photographic printing paper at a predetermined speed over a region from the film exposure section to the index exposure section; and a light-source controlling device which saves an amount of light of the light source when the index exposure section is set in a non-operating state, and which controls the light source to emit a predetermined amount of light when the conveying device starts conveying the photographic printing paper in a state in which a predetermined position of the photographic printing paper is directed toward the index exposure section, whereby images of frames on the photographic film and the index images are continuously formed on the photographic printing paper.

According to a sixth aspect of the present invention, the photographic printer according to the fifth aspect of the present invention includes an image display device having a color display.

According to a seventh aspect of the present invention, there is provided an index printer in which a plurality of photographed images recorded on image frames of a photographic film are displayed on an image display device, and the plurality of images displayed on the image display device is exposed onto a photographic printing paper so that an index print is formed such that the plurality of images are arranged in a matrix form on the photographic printing paper. The index printer includes: an image-dividing/setting device for setting the number of frames displayed on the image display device and for exposure magnification of the images displayed on the image display device and for dividing the image frames of the photographic film into sets of image frames so as to set the images to be displayed on the image display device; and an exposed-image display device for displaying, on the image display device, the images set by the image-dividing/setting device.

According to an eighth aspect of the present invention, there is provided an index printer in which a plurality of photographed images recorded on image frames of a photographic film are displayed on an image display device, and the plurality of images displayed on the image display device is exposed onto a photographic printing paper so that an index print is formed such that the plurality of images are arranged in a matrix form on the photographic printing paper. The index printer includes: a determining device for determining whether an image is recorded on each of the image frames; and an alternative display device in which a predetermined indicating frame is disposed at a display position of an image frame which is determined by the determining device to contain no image, an alternative display is made at a predetermined position of the image display device.

According to a ninth aspect of the present invention, there is provided an index printer in which a plurality of photographed images recorded on image frames of a photographic film are displayed on an image display device, and the plurality of images displayed on the image display device is exposed onto a photographic printing paper so that an index print is formed such that the plurality of images are arranged in a matrix on the photographic printing paper. The index printer includes: a displayed-image changing device for determining an image size of each frame displayed on the image display device and for determining a dimension of a space between adjacent images in accordance with exposure magnification when the images displayed on said image display device are exposed onto the photographic printing paper.

In accordance with the first aspect of the present invention, when the index print of images recorded on the photographic film is prepared, the images are displayed on the image display device every predetermined number of frames and are subjected to divided exposure processing and formed as the index images on the photographic printing paper.

It suffices that the number of frames displayed on the image display device, the size of each image and the exposure magnification may be previously set in accordance with the resolution of the image display device, or the like. This makes it possible to obtain an index print of well-suited quality having images which are not coarse-grained.

It suffices that the amount by which the photographic printing paper is conveyed during divided exposure processing of the index images may be set in accordance with the size of an image frame exposed onto the photographic printing paper and the dimension of the space between adjacent image frames disposed along the direction in which the photographic printing paper is conveyed. This makes it possible to obtain an index print constructed such that image frames are respectively arranged at uniform intervals.

In accordance with the second aspect of the present invention, when there exists an unexposed frame on the photographic film, it is clearly indicated that an image is not recorded at a position of this frame. As a result, it is possible to prevent deterioration of the finished quality of an index print, caused by the unexposed frame appearing, as an empty portion or the like, on the index print, and at the same time, to clearly determine that the unexposed frame was not subjected to photographing.

In accordance with the third aspect of the present invention, when plural unexposed image frames are disposed in a continuous sequence, one indicating frame is disposed on the index print and the remaining unexposed frames are omitted so that the next image is disposed after the indicating frame.

As a result, even when a large number of image frames are unexposed ones, there is no possibility that indicating frames with no image therein be disposed continuously or that an unnecessary empty portion is formed, thereby resulting in saving of the photographic printing paper. Further, the photographic condition of each of the photographic film is clear. Meanwhile, the indicating frame is not necessarily limited to an unexposed frame, and for example, it can be disposed at a position of a frame whose image is damaged by fogging or the like.

In accordance with the fourth aspect of the present invention, when it is necessary to change exposure magnification of images displayed on the image display device, for example, by reason of alteration in the widthwise dimension of the photographic printing paper, not only exposure magnification is changed, but also the size of each image frame displayed on the image display device and the dimension of a configuration space between adjacent frames are changed. The size of each image frame displayed on the image display device and the dimension of the configuration space between adjacent frames are previously set in accordance with the exposure magnification, and based on this setting, the display of the image display device is altered.

As a result, it is possible to prevent occurrence of problems such as: the widthwise dimension of the photographic printing paper is made larger and the images displayed on the image display device are exposed at the predetermined magnification, a finished index print is made larger than the predetermined size so as to be formed in an irregular size; or the finished index print is made too large to be contained in a DP bag. Further, it is also possible to prevent deterioration of resolving power and excessive widening of the space between adjacent image frames, which are due to over-magnification of the images. Moreover, by effectively using the image display device limited in resolution and display area, an index print of high finished quality can be prepared.

In accordance with the fifth aspect of the present invention, an amount of light emitted from the image display device is saved when the index exposure section for preparing index prints is set in a non-operating state. This makes it possible to save energy to be consumed by an entire apparatus, and to prevent heat deterioration of the image display device, resulting from excessive heating of the image display device by self-generating heat of the image display device or heat emitted from the light source. Thus, an index print of uniform quality can be prepared for a long period of time.

In accordance with the sixth aspect of the present invention, the image display device which allows color display is used. As a result, for example, it is not necessary to expose, in a superposed manner, color separation images of three colors of red, blue and green for each color image, thereby resulting in reduction in exposure time of the index print.

Further, it is extremely easy to correct color tone, gradation or the like, of an image converted into an electric signal to be displayed on the image display device (i.e., image data), and it is possible to print proper color images by an image data processing operation.

In accordance with the seventh aspect of the present invention, the images divided by the image-dividing/setting device into sets of predetermined number of frames are displayed on the image display device and are exposed onto the photographic printing paper.

In accordance with the eighth aspect of the present invention, it is determined by the determining device whether an image is recorded on each of image frames, and the indicating frame is assigned by the alternative display device to an image frame which is determined as having no image recorded therein. As a result, index images in which the indicating frame is assigned to an unexposed image frame are formed on the index print. The indicating frame can be assigned not only to the unexposed image frame, but also to, for example, an image frame whose image quality has been damaged by fogging or the like.

In accordance with the ninth aspect of the present invention, the displayed-image changing device changes the size of each image frame and the dimension of space between adjacent image frames in accordance with exposure magnification. When the images are exposed onto the photographic printing paper in accordance with the changed display image, an entirely well-balanced index print can be prepared.

BRIEF DESCRIPTION OF THE DRAWINGS

FIG. 3A is a schematic view illustrating an index print of a negative film for photographing 40 shots.

FIG. 3B is a schematic view illustrating an index print of a negative film in which first to sixteenth frames have been subjected to photographing.

FIG. 3C is a schematic view illustrating a comment frame.

FIG. 4 is a flowchart illustrating an example of an operation of the index exposure section.

FIG. 6 is a schematic structural view of a photographic printer applied to a second embodiment of the present invention.

DESCRIPTION OF THE PREFERRED EMBODIMENTS

Referring now to the attached drawings, a description will be given of embodiments of the present invention, in which a liquid crystal panel is used as an example of an image display device.

Figure 1:
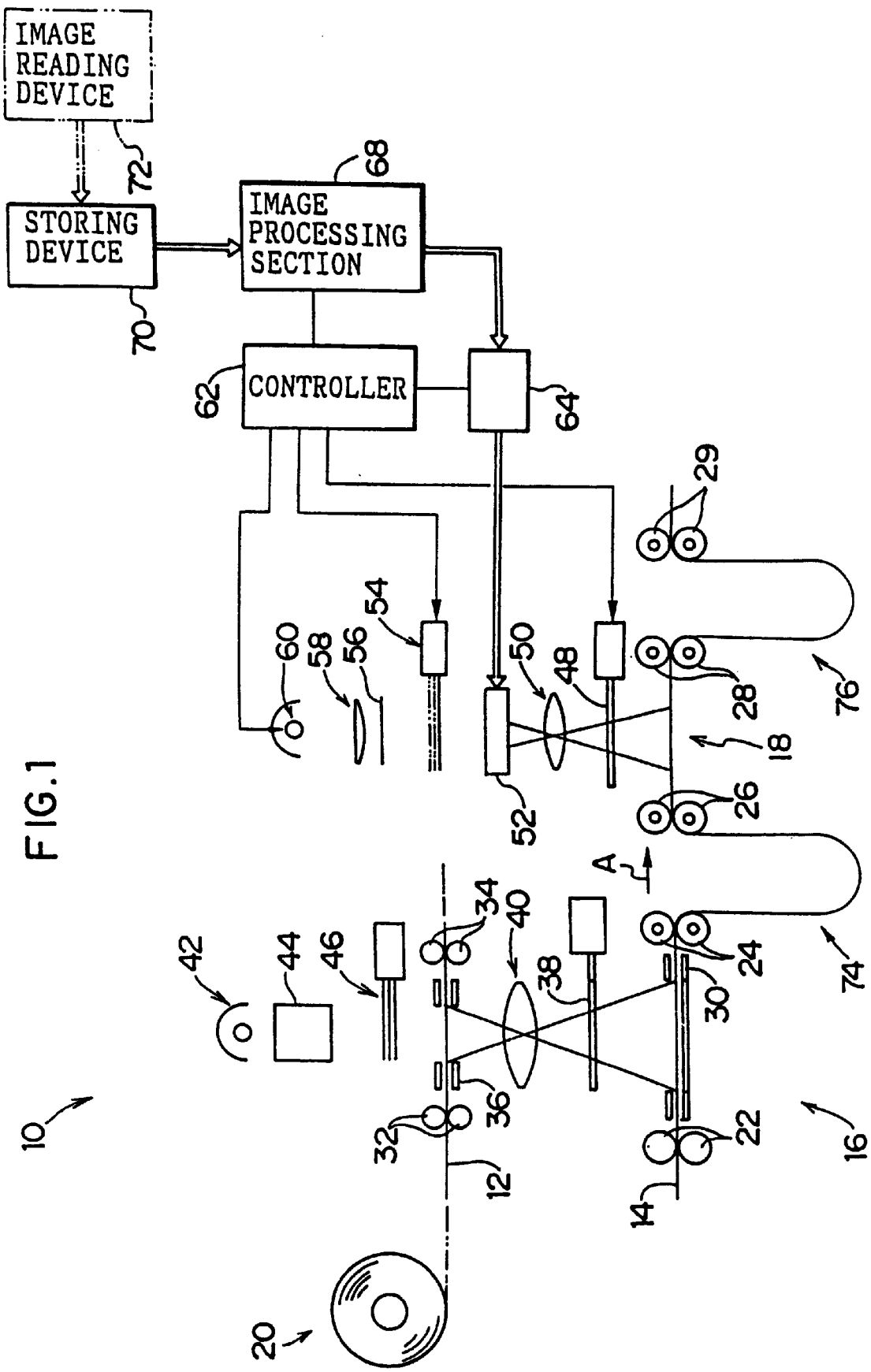
FIG. 1 is a schematic structural view illustrating a photographic printer applied to an embodiment of the present invention.

FIG. 1 shows a schematic structure of a photographic printer 10 applied to a first embodiment of the present invention. The photographic printer 10 includes a film exposure section 16 and an index exposure section 18. The film exposure section 16 is used to expose, onto a photographic printing paper (which is hereinafter referred to as a "color paper 14"), an image recorded on each of image frames of a color photographic film (which is hereinafter referred to as a "negative film 12"). The index exposure section 18 is used to expose, onto the color paper 14, index images formed such that images of respective image frames on the negative film 12 are disposed in a matrix form. Further, the index exposure section 18 functions as an index printer of the present invention and in this embodiment, it will be hereinafter described as a photographic printer 10 equipped with an index printer. The color paper 14 on which images are exposed by the photographic printer 10 is subjected to development processing in an unillustrated processor section which is disposed adjacent to the downstream side of the photographic printer 10. An index print 80 of the negative film 12 and a photographic print 82 of each frame are formed on the color paper 14 processed in this manner (see FIG. 3A).

Meanwhile, the photographic printer 10 together with the processor section may form a printer processor. The color paper 14 is mounted on the photographic printer 10 in a state of being wound up in the form of a roll and accommodated in an unillustrated magazine, and is successively pulled out of the magazine so that images are exposed on the color paper 14. Further, a large number of rolls of negative film 12 are connected to each other to form a roll-shaped negative roll 20 and are mounted on the photographic printer 10. Moreover, it is possible to use, as the negative film 12, a photographic film which photographs recordable 15, 25 or 40 images (shots) and which has perforations recorded thereon for clearly setting respective positions of image frames and has a magnetic recording layer on which various information can be recorded in a non-image frame portion at the time of recording or the like.

As shown in FIG. 1, in the photographic printer 10, a plurality of roller pairs for conveying the color paper 14 are disposed in the film exposure section 16 and the index exposure section 18 (in FIG. 1, roller pairs 22, 24 and roller pairs 26, 28, 29 are illustrated). The color paper 14 is conveyed in the film exposure section 16 and the index exposure section 18 by these roller pairs 22, 24, 26, 28 and 29.

A mask 30 is disposed at an exposure position between the roller pairs 22, 24 in the film exposure section 16 and an image is exposed onto a portion of the color paper 14 positioned on the mask 30. A negative carrier 36 is disposed between roller pairs 32, 34 for conveying the negative film 12 on an opening side of the mask 30 (i.e., the upper direction side of the paper in FIG. 1), and the negative film 12 pulled out of the negative roll 20 is conveyed into the negative carrier 36.

Meanwhile, an unillustrated sensor is disposed on an upstream side of the negative carrier 36 in a direction in which the negative film is conveyed. The sensor is used to detect perforations or the like which indicate respective positions of the image frames recorded on the negative film 12. Each image frame of the negative film 12 is correctly positioned on the negative carrier 36 based on the results detected by the sensor. Further, a magnetic head (not shown) for reading magnetic information recorded on the negative film 12 is provided in the vicinity of the negative carrier 36, and based on various magnetic information read by the magnetic head, a photographic print can be prepared.

A shutter 38 and an optical system 40 are disposed between the negative carrier 36 and the mask 30, so that an image recorded on an image frame of the negative film 12 is formed on the color paper 14 with a predetermined magnification. Further, a light source 42, a diffusion tube 44 and a color filter 46 are disposed so as to be opposed to the mask 30 with the negative carrier 36 disposed therebetween.

For this reason, after white light emitted from the light source 42 is diffused by the diffusion tube 44, the diffused light is corrected by three filters of Y(yellow), M(magenta) and C(cyan) of the color filter 46 and is irradiated on the negative film 12. The light irradiated on the negative film 12 is transmitted therethrough in accordance with an image recorded on the negative film 12 and is exposed onto the color paper 14. It should be noted that, as the film exposure section 16, a general exposure section for exposing an image recorded on a photographic film onto a photographic printing paper or the like can be used, and a detailed description thereof will be omitted.

Meanwhile, in the index exposure section 18, a black shutter 48, an optical system 50 and a liquid crystal panel (LCD panel) 52 are sequentially arranged above the roller pairs 26, 28 (i.e., on an upper side in FIG. 1). Further, a color filter 54, an infrared ray filter 56, a condenser lens 58, and a light source 60 using a halogen lamp or the like, which emits white light, are disposed above the LCD panel 52.

Figure 2:
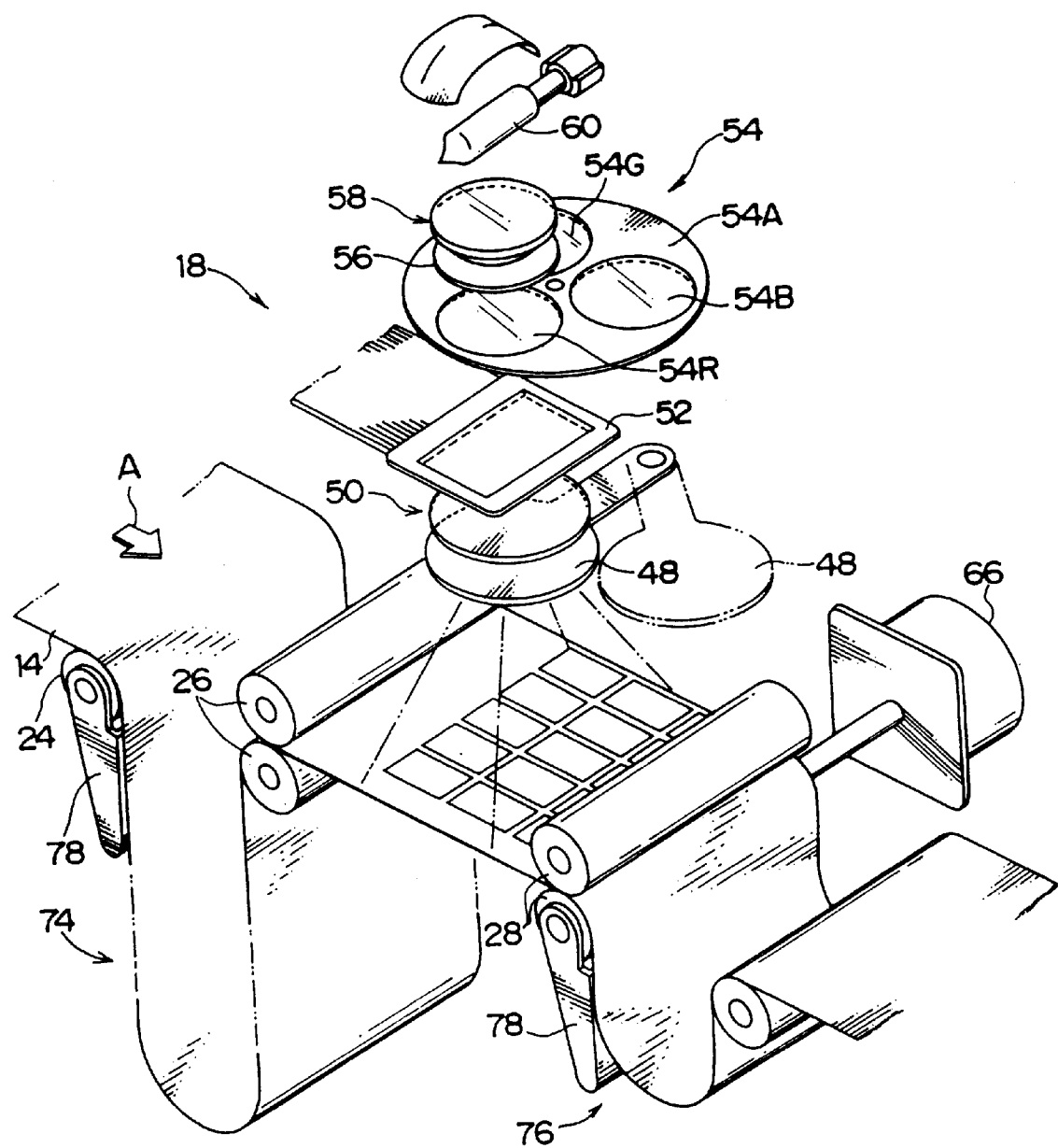
FIG. 2 is a schematic perspective view illustrating a construction of an index exposure section of the photographic printer.

As shown in FIG. 2, the color filter 54 is constructed in that three filters 54R(red), 54B(blue), 54G(green) are provided on a disk-shaped base plate 54A, and that, when the base plate 54A is driven to rotate, these filters 54B, 54G, 54R appear in order on an optical path of the light irradiated from the light source 60 to the LCD panel 52.

For this reason, the white light emitted by the light source 60 passes through the condenser lens 58, and thereafter, the light becomes red light, blue light, and green light by the red filter 54R, blue filter 54B and green filter 54G, respectively, and is irradiated on the LCD panel 52.

Further, as shown in FIG. 1, a controller 62 is provided in the index exposure section 18. The light source 60, an unillustrated pulse motor for rotatably driving the base plate 54A of the color filter 54, an unillustrated shutter driving means for driving the black shutter 48 to cause it to appear on an optical path between the LCD panel 52 and an index exposure position, an LCD driver 64 to which the LCD panel 52 is connected, and a pulse motor 66 (see FIG. 2) for driving the roller pair 28 are connected to the controller 62. The index exposure section 18 is constructed such that the color paper 14 passing through the film exposure section 16 and conveyed into the index exposure section 18 is correctly conveyed by the controller 62, and a predetermined area of the color paper 14 is positioned at an exposure position of the index exposure section 18 and is exposed with an image displayed on the LCD panel 52.

Meanwhile, an image processing section 68 for indexes and a storing device 70 are provided in the photographic printer 10. The storing device 70 is connected to an image reading device 72 such as a scanner, analyzer, or the like, which is disposed outside of the photographic printer 10. The negative roll 20 whose photographic prints are prepared by the photographic printer 10 is mounted on the image reading device 72 before being mounted on the photographic printer 10, and images recorded on each negative film 12 are read by the image reading device 72 so as to be converted into image data for each frame.

The image data read by the image reading device 72 is stored in the storing device 70. Meanwhile, the image reading device 72 is adapted to separate color image of each image frame into respective color components of red, blue and green to output image data of the respective color components. The storing device 70 stores respective image data of three color components for each image frame.

The image processing section 68 reads image data of one roll of negative film 12 stored in the storing device 70 and performs a predetermined image processing operation each time an exposure process of each negative film 12 in the negative roll 20 starts, and outputs the image data to the LCD driver 64. In the index exposure section 18, an image corresponding to the image data inputted to the LCD driver 64 is displayed on the LCD panel 52.

The LCD panel 52 is constructed in that respective image pixels formed by liquid crystal vary an amount of transmitted light in accordance with image data and an image is displayed on the LCD panel 52 by the light transmitted through each liquid crystal. The light emitted from the light source 60 passes through the LCD panel 52 in accordance with the displayed image to form an image on the color paper 14 and the color paper 14 is exposed in accordance with the displayed image of the LCD panel 52. Meanwhile, image patterns respectively divided into color images of red, blue and green are successively displayed on the LCD panel 52 and the color paper 14 is subjected to superposed exposure processing with three colors of red, blue and green so that a color image is formed on the color paper 14.

In the present embodiment, as the LCD panel 52, a relatively high-resolution LCD panel is used which has resolution of approximately 300 dpi and image pixels of about 1,055×about 480 (i.e., about 510,000 pixels). The magnification of the optical system 50 is set such that an image displayed on this LCD panel 52 is exposed onto the predetermined area of the color paper 14.

The image processing section 68 functions as an image-dividing/setting device. When image data of one roll of negative film 12 is read in, the image processing section 68 divides image frames of one roll of negative film 12 every ten frames and displays them on the LCD panel 52 via the LCD driver 64 serving as an exposed-image display device. As a result, index images are recorded on the color paper 14 in such a manner that five frames for each row are arranged along a widthwise direction of the color paper 14. The index images are also displayed on the LCD panel 52 in such a manner as to be divided every two rows along a direction in which the color paper 14 is conveyed (i.e., the direction indicated by arrow A).

As shown in FIG. 3A, in the index exposure section 18, by repeatedly performing exposure processing, onto the color paper 14, of the images which are displayed on the LCD panel 52 in a state of being divided every two rows, i.e., every ten frames, the index images of one roll of negative film 12 are recorded on the color paper 14. Since the index images of one roll of negative film 12 are divided and displayed on the LCD panel 52, an image of each frame displayed on the LCD panel 52 is not made smaller, so that the image can be prevented from becoming coarse-grained and prominent when the image is exposed onto the color paper 14.

When all frames of each of the negative films 12, such as those for photographing 15, 25 or 40 shots, are subjected to photographing and an image is recorded on each of the frames using a format of the index images set as described above, predetermined index images are formed on the color paper 14 by dividing the index images of each film for each section and repeatedly performing exposure processing for the divided index images at twice, three times, and four times, respectively.

On the other hand, the image processing section 68 functions as a determining device and an alternative display device of the present invention. When some photographic frame not subjected to photographing exists in one roll of negative film 12, the non-photographed frame is displayed on the LCD panel 52 such that a comment frame 84 (see FIGS. 3B and 3C) is exposed at a corresponding frame position on the index images of the color paper 14, and it is clearly indicated that the corresponding frame is not subjected to photographing. For example, as shown in FIG. 3B, when only 16 frames would have been photographed in the negative film 12 for photographing 40 shots, the comment frame 84 indicating that "following frames are not photographed" is recorded at a position which corresponds to the 17th frame.

It can be clearly understood that, since the comment frame 84 is the last frame in the index print 80A, the following frames would have not been photographed.

The photographic printer 10 constructed in the above-described manner effects exposure processing of the index images prior to the exposure processing of the images recorded on each negative film 12 in the film exposure section 16. For this reason, in the film exposure section 16, a preceding negative film 12 is advanced without exposure so as to skip over the area where the index images are exposed from a position where the last image of the preceding negative film 12 is exposed, and thereafter, the exposure processing for images of the new negative film 12 starts. In this case, when the area of the negative film where the index images are exposed reaches the index exposure section 18, the index exposure section 18 is provided to start dividing and exposing the index images of the negative film 12 in this area.

When the index exposure section 18 does not operate, i.e., when the index exposure section 18 is set in a state of not exposing the index images onto the color paper 14, the controller 62 of the index exposure section 18 saves the light source 60 so that the light source 60 is brought into a lighting state of about 60% of a rated output. When the color paper 14 starts moving in the conveying direction in the film exposure section 16, the controller 62 controls so that the light source 60 is brought into a predetermined lighting state.

Further, in the index exposure section 18, a conveying amount D by which the color paper 14 is conveyed when the index images are divided and exposed thereon is represented by the following expression:

$$D=(d^1+d^2)\times 2$$

wherein, $d^1$ is the dimension of each image frame of the index images recorded on the color paper 14, the dimension being along the conveying direction of the color paper 14 (i.e., the direction of arrow A); and $d^2$ is the dimension of an interval between adjacent frames along the direction of arrow A (see FIG. 3A). As a result, the index images are constructed in that divided and exposed frames are arranged at equal intervals.

Meanwhile, the film exposure section 16 performs exposure processing, for example, at a speed of 300 msec per each frame, and the index exposure section 18 performs exposure processing at a speed of 3 sec each time. Due to the difference in the conveying speeds, a portion of the color paper 14 becomes slack, and this slack portion is accommodated in a reservoir portion 74 which is provided between the roller pairs 24, 26. Further, the difference in the conveying speeds of the color paper 14 between the photographic printer 10 and the processor section causes a slack portion to be formed on the color paper 14, and this slack portion is accommodated in a reservoir portion 76 provided downstream of the roller pair 28 in the direction in which the color paper 14 is conveyed. A paper guide 78 shown in FIG. 2 is provided in a swingable manner for each of the roller pairs 24, 28. When the color paper 14 produces a slack portion due to the conveying speed difference, the paper guide 78 swings downward to withdraw from a conveying path of the color paper 14, so that an intermediate portion of the slack portion of the color paper 14 hangs down in the reservoir portions 74, 76.

Next, an operation of the first embodiment will be described.

In the photographic printer 10, the negative roll 20, which is formed by a plurality of developed rolls of negative film being connected together and wound in a roll-like form, is mounted on the image reading device 72 which reads an image recorded on each frame of the negative film 12. The read image is stored as the image data in the storing device 70. When the negative roll 20, for which the image data of all of the negative films 12 has been read and stored in the storing device 70, is mounted on the photographic printer 10, the index images of each negative film 12 of the negative roll 20 and images of the frames of each negative film 12 are exposed onto the color paper 14.

Figure 5:
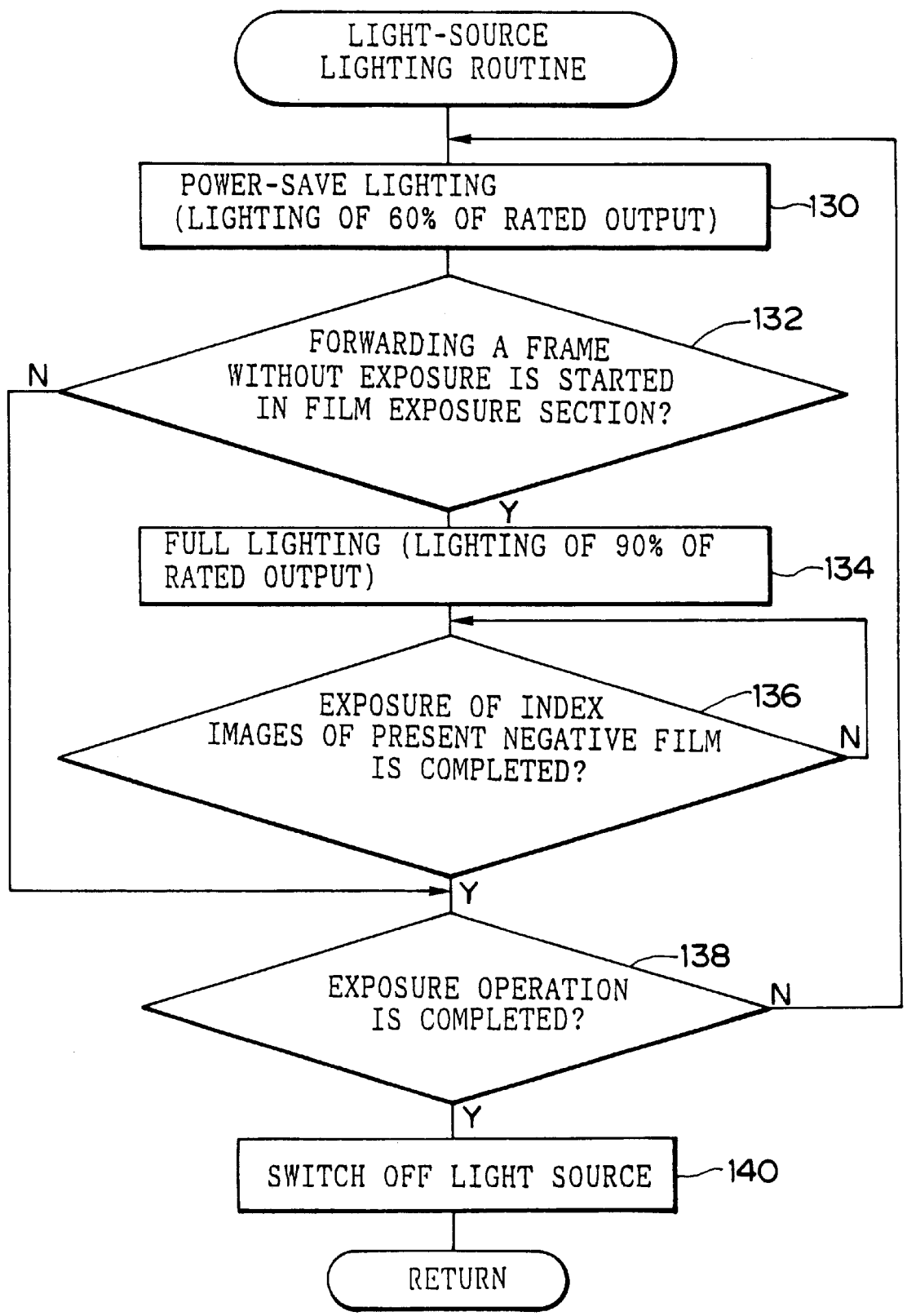
FIG. 5 is a flowchart illustrating an example of control of a lighting operation of a light source in the index exposure section.

FIG. 4 shows a flowchart schematically illustrating an operation of the index exposure section 18. Further, FIG. 5 shows a flowchart illustrating lighting control of the light source 60. With reference to these flowcharts, an exposure process of the photographic printer 10 will be described below.

The flowchart shown in FIG. 4 is executed when the negative roll 20 is mounted on the photographic printer 10 and the photographic printer 10 starts a photo-printing operation. In a first step 100, image data of each image frame of the negative film 12 to be subjected to the next exposure process is read from the storing device 70 into the image processing section 68. In the next step 102, the image processing section 68 effects an image processing operation for displaying the image data on the LCD panel 52 and for exposing the index images onto the color paper 14.

The image processing operation in the image processing section 68 is effected to correct color tone or the like such that an image of each image frame can be suitably finished when displayed on the index print, and to convert the image data of the negative film 12 into images having a predetermined format in which the image data are divided every ten frames. This format is prepared for the image data of each color of red, blue and green, and subsequently, is outputted, as the image data displayed on the LCD panel 52, to the LCD driver 64.

In addition, when there exists some image frames not subjected to photographing among image-exposable frames on the negative film 12, the image processing section 68 effects image processing such that the comment frame 84 is inserted and the subsequent non-photographed frames are not displayed on the LCD panel 52. For example, when 16th and subsequent image frames have not been subjected to photographing in the negative film 12 for photographing 40 shots, the comment frame 84 is provided at the 17th frame of the index images and the subsequent image frames are made empty. Next, in a step 104, the number of a divided exposure operations is set, for example, two. As a result, the image processing section 68 operates such that the index images are formed in an area of the color paper 14 in which twenty image frames can be recorded. By effecting the image processing operation in such a way as described above, the area for forming predetermined index images on the color paper 14 (disposed along the direction in which the color paper 14 is conveyed) and the number of divided exposure operation are respectively set.

In a next step 106, it is determined whether or not the area of the color paper 14 in which the index images are exposed has passed through the film exposure section 16. As shown in FIG. 3A, this embodiment is constructed in that the photographic print 82 of each image frame is prepared on the elongated color paper 14 subsequent to the index print 80. In the film exposure section 16, the area of the color paper 14 where the index print 80 is prepared is advanced without being subjected to exposure processing, and respective images are successively exposed on the color paper 14 subsequent to the above-described area. For this reason, in the film exposure section 16, prior to exposure processing of images recorded on the negative film 12, the area of the color paper 14 where the index images are to be exposed is advanced without being subjected to exposure processing by a length set by the above-described step 104.

When it is detected that the area of the color paper 14 advanced without being subjected to exposure processing has been conveyed to the index exposure section 18 (i.e., when decision of step 106 is yes), the color paper 14 is positioned at an exposure position of the index exposure section 18, the index images of the first ten divided image frames are displayed on the LCD panel 52, and the color filter 54 is driven to cause the three color filters 54R, 54B, 54G to respectively project in accordance with the color of the images displayed on the LCD panel 52 (step 108). Next, the black shutter 48 is opened and the color paper 14 is exposed with light of the color corresponding to the image displayed on the LCD panel 52 (step 110).

When the exposure processing of the respective color images of red, blue and green for each divided index image is completed (i.e., when decision of step 112 is yes) and when decision of step 114 is no, the routine proceeds to step 116, in which the color paper 14 is conveyed by a predetermined amount in the index exposure section 18. Thereafter, the routine returns to step 108, in which the exposure processing of the subsequent divided ten index images (i.e., the image frames of the negative film 12 from 11th to 20th image frames) is performed. At this time, the amount by which the color paper 14 is conveyed is the same as the length including two image frames and a margin therebetween when the index images are finished as the index print. By exposing the next divided index images after the color paper 14 is conveyed by the above-described amount, overlapping of the divided and exposed index images is prevented.

When the divided exposure processing of the index images on the predetermined area of the color paper 14 is completed in the manner as described above (i.e., when decision of step 114 is yes), the color paper 14 is conveyed at a constant speed in the index exposure section 18 and is sent out to an unillustrated processor section (step 118).

Concurrent with the exposure processing of the index images in the index exposure section 18, the film exposure section 16 successively effects exposure processing of image frames on the negative film 12, and after the index-image area of the color paper 14 is advanced without being subjected to exposure processing, image frames are forwarded sequentially while the color paper 14 is being exposed in accordance with images recorded on the negative film 12.

On the other hand, the routine the flow chart shown in FIG. 5 is executed when the photographic printer 10 starts operating. In a first step 130, power-save lighting of the light source 60 is effected. The light amount of the light source 60 during the power-save lighting operation is set 60% of the rated output and consumption of electric power and an amount of generated heat are both reduced.

In the next step 132, it is determined whether or not the area of the color paper 14 where the index images are to be exposed has been advanced in the film exposure section 16 without being subjected to exposure processing. When decision of step 132 is yes, the light source 60 is lighted to the full rated output and is brought into a stabilized lighting state (i.e., approximately 90% of the rated output) with a predetermined amount of light until the exposure process for the index images on the color paper 14 starts (step 134). In this state, the index exposure section 18 effects the exposure process for the index images on the color paper 14.

The next step 136 determines whether a predetermined divided exposure operation of one roll of negative film 12 has been completed. When the decision of step 136 is yes, step 138 determines whether the operation of the photographic printer 10 should finish. When the exposure operation of the index images is effected continuously (i.e., when decision of step 138 is no), the routine proceeds to step 130, in which the power-save lighting of the light source 60 is effected. Further, when the photographic printer 10 finishes operating, the light source 60 is turned off in step 140 and the routine ends.

As described above, in the index exposure section 18, during a non-exposure operation, i.e., when the index images are not being exposed on the color paper 14, the light source 60 is brought into a power-save lighting state. This makes it possible to prevent the LCD panel 52 from being unnecessarily heated due to heat of the light source 60 and to prevent heat deterioration of the LCD panel 52. At this time, since there is no possibility that the light source 60 be merely turned off, it is also possible to prevent the light source 60 itself from deteriorating, which is caused by the light source 60 repeatedly being switched on and off. Further, the light source 60 can reliably be brought into a stabilized lighting state during the exposure operation of the index images, so that the index print can be prepared with no exposure unevenness.

Further, when the images recorded on the negative film 12 are displayed, as the index images, on the LCD panel 52, all images of one roll of negative film 12 are not displayed together at the same time, but are displayed in a state of being divided into a predetermined number of image frames. When all images recorded on the negative film 12 are, as the index images, displayed together by using the LCD panel 52 limited in size, respective images are made smaller and it is necessary to magnify the images or lessen the rate of reduction for the images when exposed on the color paper 14. For this reason, there is a possibility that the image exposed on the color paper 14 becomes coarse so that a finished quality of the index print 80 may deteriorate.

In comparison with the aforementioned, since the images of the negative film 12 are divided each predetermined number of frames and the index images to be exposed onto the color paper 14 are divided for exposure processing, each image displayed on the LCD panel 52 can be made relatively larger. For this reason, it is possible to prevent the image exposed on the color paper 14 from becoming coarse, thereby allowing the index print 80 with high finished quality to be obtained.

Meanwhile, this embodiment is constructed in that negative films for photographing 15, 25 and 40 shots are used as the negative film 12 and ten image frames (5 frames×2 rows) are exposed in one divided exposure operation, but the number of frames for one exposure operation and the arrangement of images are not limited to the same.

Next, a second embodiment of the present invention will be described. It should be noted that a basic structure of the second embodiment is the same as that of the first embodiment and that the same members as those of the first embodiment will be denoted by the same reference numerals, and a description thereof will be omitted.

FIG. 6 shows a schematic construction of an index exposure section 92 of a photographic printer 90 applied to the second embodiment. The index exposure section 92 is provided with an optical system 94 having a zoom lens which serves as a magnification-changing optical member. Since the optical system 94 is provided in that magnification thereof is changed by a signal from the controller 62, exposure magnification of an image displayed on the LCD panel 52 can be changed.

In the photographic printer 90, a 89 mm-wide color paper 14A and a 102 mm-wide color paper 14B are both used as the color paper 14 to be exposed and images can be respectively exposed on the color papers 14A, 14B in accordance with each widthwise dimension thereof. (see FIGS. 7A and 7B, and when it is not necessary to make a distinction between these color papers 14A, 14B, the color paper 14 merely will be referred to.)

Meanwhile, the controller 62 is adapted to change modification of the optical system 94 in accordance with the widthwise dimension of the color paper 14 by control of the image processing section 68 and to change the size of each image frame displayed on the LCD panel 52 and the dimension of a space between adjacent image frames. Namely, the image processing section 68 functions as a displayed-image changing device of the present invention and changes the size of each frame displayed on the LCD panel 52 and the dimension of the space between adjacent image frames in correspondence with exposure magnification of an image inputted from the controller 62. It should be noted that the size of each frame displayed on the LCD panel 52 and the dimension of the space between adjacent frames are previously set and stored as the format of the index images, and the format are selected together with the magnification of the optical system 94 in accordance with the widthwise dimension of the color paper 14 mounted on the photographic printer 90. Further, the conveying amount D by which the color paper 14 is conveyed at the time of divided exposure processing is set to be changed together with exposure magnification.

Figure 7A:
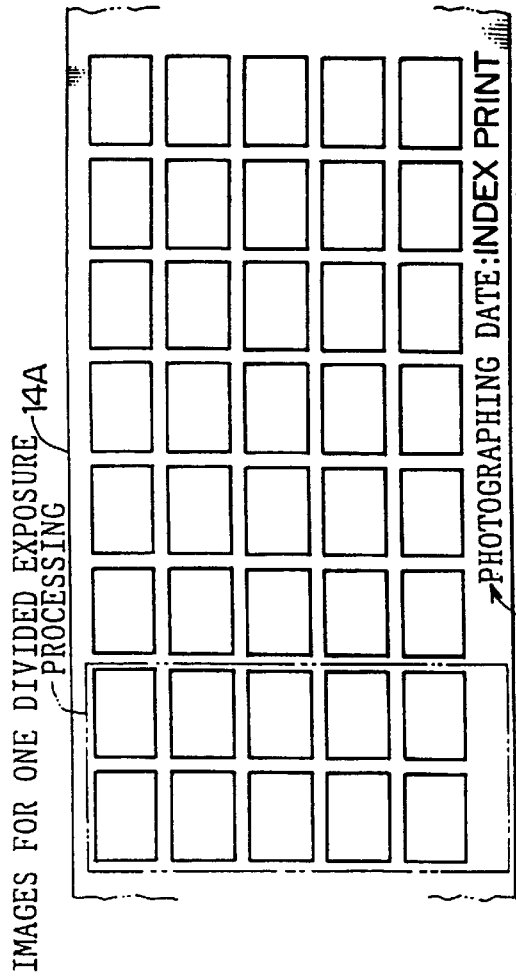
FIG. 7A is a schematic view of an index print prepared on a color paper used in the photographic printer according to the second embodiment.
Figure 7B:
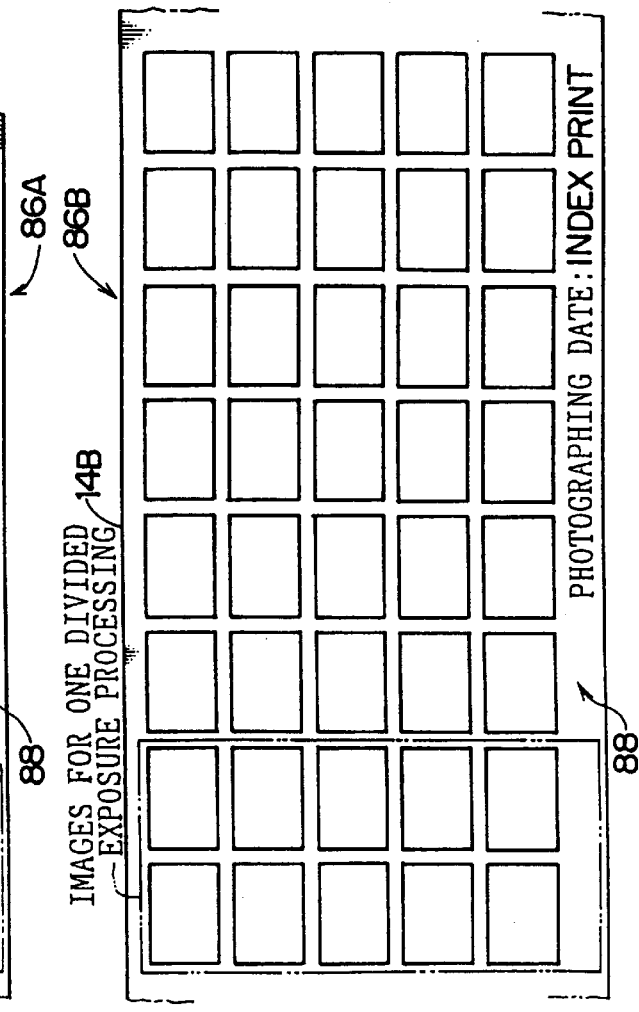
FIG. 7B is a schematic view of an index print prepared on a color paper whose widthwise dimension is different from that of the color paper shown in FIG. 7A and which is used in the photographic printer according to the second embodiment.

As shown in FIGS. 7A and 7B, a comment area 88 where characters can be exposed which indicate various information such as a photographing place of the negative film 12, a photographing date, an event name, and the like, is provided in an index print 86 (86A or 86B) exposed on the color paper 14. The characters recorded in the comment area 88 correspond to, for example, information magnetically recorded on the negative film 12 or information inputted to and processed by the image processing section 68, and are displayed, as a part of the index images, on the LCD panel 52. The size of the characters recorded in the comment area 88 is also set to be changed in accordance with exposure magnification.

The 89 mm-wide color paper 14A is mounted on the photographic printer 90 set in the above-described manner. When the index images are exposed on the color paper 14A, the index images are displayed on the LCD panel 52 based on the format stored in accordance with the color paper 14A and the divided exposure operation is effected while the color paper 14A is being conveyed by the conveying amount D by which it is conveyed in accordance with a predetermined magnification and exposure magnification.

On the other hand, when the index images are exposed on the 102 mm-wide color paper 14B, the magnification of the optical system 94 is changed, and at the same time, the conveying amount by which the color paper 14B is conveyed during the divided exposure operation, the display of the LCD panel 52, and the like are changed.

Here, when the same images as those of the color paper 14A are simply displayed on the LCD panel 52 and are exposed with the magnification corresponding to the widthwise dimension of the color paper 14, the dimension of the space between adjacent frames, the comment area 88, and characters recorded in the comment area 88 are made larger. As a result, a blank portion in the index print 86B becomes prominent and the characters in the comment area 88 are felt large, so that the finished quality of the index print 86B may deteriorate.

On the contrary, for example, when the index images are exposed on the color paper 14B, the image processing section 68 controls the controller 62 so that the space between adjacent frames displayed on the LCD panel 52, a widthwise dimension of the comment area 88 on the LCD panel 52 and each character recorded in the comment area 88 on the LCD panel 52 are respectively made smaller in comparison with the case in which the index images are exposed on the color paper 14A. As a result, the space between adjacent image frames recorded on the index print 86B, the widthwise dimension of the comment area 88 of the index print 86B and the size of characters recorded in the comment area 88 thereof can be made similar to or slightly larger than those of the index print 86A. Accordingly, there is no possibility that the finished quality of the index print will be poor because a blank portion of the index print 86B becomes prominent and the characters recorded in the comment area 88 and the size of each image are poorly balanced with each other.

Further, by setting the conveying amount D of the color paper 14 at the time of the divided exposure operation in accordance with the exposure magnification and the images displayed on the LCD panel 52, the intervals of images subjected to the divided exposure processing can be set uniform and an area of the color paper 14 necessary for exposing the index images can be correctly understood. Further, even if an exposure operation of images recorded on the negative film 12 and an exposure operation of the index images are separately effected, the index images can be correctly exposed in a predetermined area on the color paper 14.

Meanwhile, it suffices that, when the index images are exposed on the color paper 14, the exposure magnification provided such that images, a blank portion, characters within the comment area 88, and the like are finished in a well-balanced state, and the arrangement of divided index images displayed on the LCD panel 52 may be set.

Further, it suffices that the format such as the size of each image displayed on the LCD panel 52 and the dimension of the space between adjacent image frames, the exposure magnification and the like may be previously set such that the index print can be finished into a desired state. As a result, there occur various problems such that, when the widthwise dimension of the color paper 14 is made larger, the size of the index print changes irregularly and that the index print is made too long so that it cannot be put in a DP bag (i.e., a bag used for transfer of the negative film between a photo processing shop and a customer) which contains the index print together with the negative film 12 and is returned to the customer.

In each of the photographic printers 10, 90 described in the first and second embodiments, the LCD panel 52, whose each liquid crystal varies only a transmission amount of light, is used and color images of red, blue and green are exposed on the color paper 14 in a superposed state to prepare the index print. However, the present invention is not limited to the same.

Figure 8:
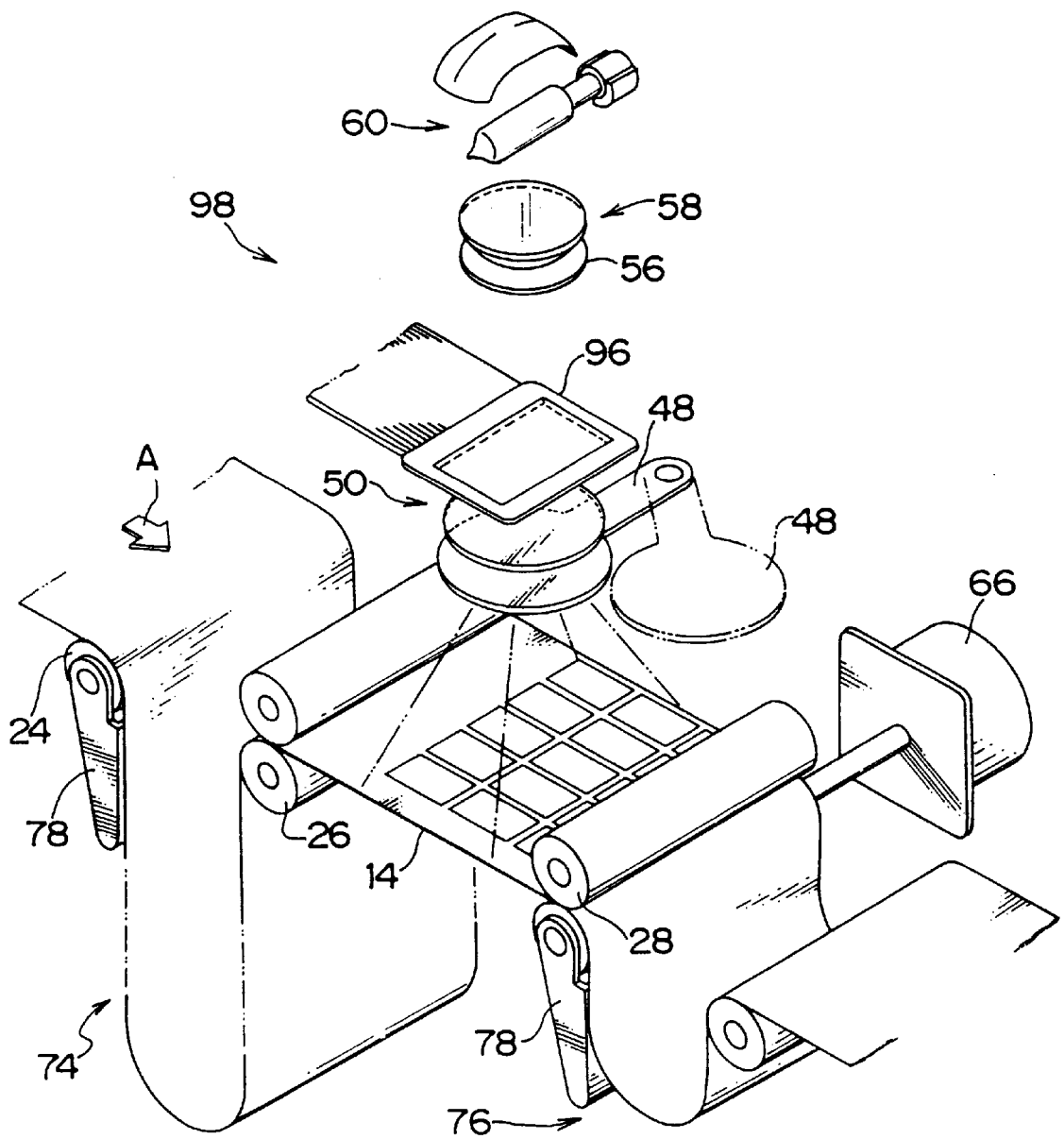
FIG. 8 is a perspective view illustrating a schematic structure of an index exposure section in which a color LCD panel applied to a third embodiment of the present invention is used.

FIG. 8 shows a schematic structure of an index exposure section 98 using a color LCD panel 96 on which color images can be displayed. The color LCD panel 96 is disposed in that respective color filters of red, green and blue are provided for each image pixel so that a color image can be displayed by light transmitted through each image on the LCD panel 96. When the color LCD panel 96 is used, the color filter 54 can be eliminated and the color images can be formed on the color paper 14 in one exposure operation, thereby resulting in reduction of the number of times of exposure operation and the exposure time. Further, since the color filter 54 is eliminated and the number of times of exposure operation is reduced, the number of times for operating the black shutter 48 can be substantially reduced (simply speaking, to one third of the number of times for operating the black shutter 48 in a case of the color filter 54 being used) and durability of a mechanical driving portion can be improved.

Meanwhile, in the present embodiments, the case of the photographic printer using the negative roll 20 for effecting a photographic printing operation of a large number of rolls of continuous negative films 12 was described as an example. However, the present invention may be of course applied to a photographic printer used in a so called mini-lab or the like, where the negative films 12 are subjected to photographic processing one by one, or to a printer processor into which a photographic printer is incorporated. At this time, the image reading device for reading images to prepare an index print may also be incorporated into the photographic printer. Further, the photographic printer may also be constructed in that an image of one frame is displayed on the LCD panel 52 and exposed onto the color paper 14, and the film exposure section 16 and the index exposure section 18 are unified as one exposure section.

Further, in the present embodiments, the case was described in which the index print is formed at a leading end of the photographic print of each negative film. However, the index print may be formed subsequent to the last photographic print of each negative film.

Although the present embodiments were described in which the liquid crystal panel 52 is used as the image display device, there can be used, as the image display device to which the present invention can be applied, the following image display devices in addition to the above-described liquid crystal panel. Examples of a light emitting display panel are a cathode ray tube (CRT), a plasma display (PDP), an electroluminescent display (ELD), a vacuum fluorescent display (VFD), and a light emitting diode (LED). Examples of light-receiving display panels are: a liquid crystal display (LCD), an electrochemical display (ECD), an electrophoretic image display (EPID), a suspended particle display (SPD), a twisting ball display (TBD), a transparent ceramics display (PLZT), and a digital micro mirror device (DMD). Meanwhile, it suffices that the image display device applied to the present invention can display images in accordance with those photographed by a photographic film, and the present invention is not limited to the above-described examples. Any similar image display devices can also be used.

As described above, in the method of exposing index prints and the index printer according to the present invention, index prints of high finished-quality can be prepared by dividing and exposing images recorded on one roll of photographic film and by using an image display device whose size is limited. Further, since photographic frames not subjected to photographing in a photographic film are clearly indicated and the subsequent frames are omitted, there is no possibility that an unnecessary empty portion exist in the index print.

Moreover, since the photographic printer of the present invention is constructed in that an amount of light emitted from the image display device or the light source is saved when the index exposure section is set in a non-operating state, it has the capability to prevent the image display device from deteriorating due to the heat of the image display device itself or the light source and to prepare index prints having a constant quality for a long period of time.

What is claimed is:

1. A photographic printer comprising:
   a film exposure section in which an elongated photographic printing paper is exposed at a predetermined interval in accordance with images recorded on frames of a photographic film;
   an index exposure section having an image display device and a light source, wherein the images recorded on frames of the photographic film are displayed on said image display device in a matrix form and the images displayed on said image display device are exposed as index images at a predetermined position of the photographic printing paper;
   a conveying device for conveying the photographic printing paper over a region from said film exposure section to said index exposure section; and
   a light-source controlling device which reduces an amount of light emitted by said light source when said index exposure section is set in a non-operating state, and which controls said light source to emit a predetermined amount of light when said conveying device starts conveying the photographic printing paper in a state in which the predetermined position of the photographic printing paper is directed toward said index exposure section.

2. A photographic printer according to claim 1, wherein said image display device allows color display.

3. The photographic printer according to claim 1, wherein said light-source controlling device controls said light source such that an amount of light emitted therefrom is set to 60% of a rated output when said index exposure section is set in a non-operating state.

4. The photographic printer according to claim 1, wherein said light-source controlling device controls said light source such that an amount of light emitted therefrom is set to about 90% of a rated output when a conveying operation of the photographic printing paper toward said index exposure section starts.

5. A photographic printer according to claim 1, further comprising:
   an image processing section for processing images displayed on said image display device.

6. The photographic printer according to claim 5, wherein said image processing section sets the number of image frames displayed on said image display device and the exposure magnification of images exposed onto the photographic printing paper.

7. The photographic printer according to claim 5, wherein, when a frame on which no image is recorded exists, said image processing section processes images such that a predetermined indicating frame which indicates that no image is recorded is disposed at a position, on said image display device, of the frame on which no image is recorded.

8. A photographic printer according to claim 1, wherein said index exposure section includes color filters of a plurality of colors disposed between said light source and said image display device.

9. A photographic printer according to claim 8, wherein said image display device displays respective images of a plurality of colors into which an image frame is separated.

10. A photographic printer according to claim 1, wherein said index exposure section has a magnification-changing optical member disposed downstream of an optical path of said image display device, said magnification-changing optical member changing exposure magnification of images exposed on the photographic printing paper.

* * * * *